(12) United States Patent
Schulte et al.

(10) Patent No.: US 7,549,691 B2
(45) Date of Patent: Jun. 23, 2009

(54) LOCKING ARRANGEMENTS FOR REMOVABLE END GATES

(75) Inventors: Edward L. Schulte, White Lake, MI (US); Matthew J. Nelson, Washington, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/734,392

(22) Filed: Apr. 12, 2007

(65) Prior Publication Data

US 2008/0252094 A1 Oct. 16, 2008

(51) Int. Cl.
*B60P 1/267* (2006.01)
(52) U.S. Cl. ........................................ 296/50; 296/57.1
(58) Field of Classification Search ................... 296/50, 296/56, 26.11, 37.6, 57.1; 298/235
See application file for complete search history.

(56) References Cited

U.S. PATENT DOCUMENTS

| | | | | |
|---|---|---|---|---|
| 5,004,287 A | * | 4/1991 | Doyle | 296/57.1 |
| 5,358,301 A | * | 10/1994 | Konchan et al. | 296/59 |
| 5,415,058 A | * | 5/1995 | Young et al. | 280/507 |
| 5,711,569 A | * | 1/1998 | Sovoda | 296/57.1 |
| 5,857,738 A | * | 1/1999 | Hamilton | 296/50 |
| 5,988,724 A | * | 11/1999 | Wolda | 296/57.1 |
| 6,793,263 B1 | * | 9/2004 | Bruford et al. | 296/50 |
| 6,905,156 B2 | * | 6/2005 | Miller et al. | 296/50 |
| 7,156,441 B2 | * | 1/2007 | Austin | 296/57.1 |
| 7,213,858 B2 | * | 5/2007 | Smith | 296/57.1 |
| 2004/0026950 A1 | * | 2/2004 | Zagaroff | 296/57.1 |
| 2004/0262938 A1 | * | 12/2004 | Bruford et al. | 296/50 |
| 2006/0082181 A1 | * | 4/2006 | Austin | 296/50 |

* cited by examiner

*Primary Examiner*—Kiran B. Patel

(57) ABSTRACT

An end gates which provides access to a cargo area of an automotive vehicle has a pair of outwardly opening cups which receive a pair of opposed pins directed inwardly from the cargo area. The end gate is rotatable from a closed vertical position through substantially 90° to provide horizontal access to the cargo area. The pins on the cargo area are aligned with notches in the cups when the end gate is in an intermediate position so that the end gate may be removed from the cargo area. In order to prevent the end gate from becoming inadvertently detached from the cargo area, resilient retainer clips are provided that overlie the notches so as to lock the pins in the cups and retain the end gate on the vehicle. The resilient retainer clips are rotated out of alignment with the notches when it is desired to remove the end gate from the vehicle.

16 Claims, 10 Drawing Sheets

LOCKING ARRANGEMENTS FOR REMOVABLE END GATES

FIELD OF THE INVENTION

The present invention is directed to locking arrangements for removable end gates, and more particularly, to such arrangements wherein hinges of removable end gates used in automotive vehicles are selectively locked and unlocked to prevent and permit uncoupling of the end gates.

BACKGROUND OF THE INVENTION

Vehicles such as pick-up trucks and similar vehicles usually have end gates at the rear of cargo areas wherein the end gates are capable of being removed from the vehicle without the use of tools. This feature is usually achieved by a post and cup type hinges, frequently referred to as trunion hinges. Trunion hinges have posts that fit within cups to allow the end gates to rotate between open and closed positions. Removal of the end gates from cargo areas is currently accomplished by notches in the sides of the cups with which pins having pairs of parallel flats are aligned when the end gates are in a removable position. The removable position is intermediate between open and closed positions of the end gates with respect to the cargo areas. This allows end gates to decouple from hinge posts when the flats on the posts and notches align resulting in a possibility that an open end gate could bounce to the removal angle and disengage from the hinges unintentionally, which is undesirable.

SUMMARY OF THE INVENTION

In view of the aforementioned considerations, the present invention is directed to a removable end gate arrangement wherein an end gate portion of a vehicle is removable from a cargo portion of a vehicle upon rotating the end gate about an axis to a selected position and then moving the end gate laterally with respect to the axis. The arrangement comprises a pair of cups on one of the cargo or end gate portions; wherein each cup defines a trunion of a hinge, and wherein each cup has a laterally opening notch therein that extends in an axial direction with respect to the hinge, the cups each having end openings oriented in opposite directions. The other of the cargo or end gate portions has a pair of pins which extend in opposite directions and are received in the pair of cups to configure the hinge. Each of the pins has a first cross-sectional area larger than the lateral openings of the respective notches and a second cross-sectional area smaller than the lateral openings of the notches, wherein when the second cross-sectional areas align with the notches, the tailpiece portion is removable from the cargo portion. Retainers are mounted with respect to the notches in the cups and are movable from first positions in which the retainers block the lateral openings of the notches to second positions, displaced from the lateral openings in the notches, to allow the pins to be removed from the notches when the second cross-sectional areas are aligned with the notches, thereby permitting the tailgate portion to be detached from the cargo area portion.

In one aspect of the removable end gate arrangement, the retainers are clips, which are pivotally mounted with respect to the notches.

In still a further aspect of the invention, each of the cups are mounted on a base with the retainers pivotally mounted on the base.

In still a further aspect of the removable end gate arrangement, the bases of the cups are secured to the cargo portion of the vehicle and the pins are secured to the end gate portion of the vehicle.

In still a further aspect of the end gate arrangement, the clips are made of a resilient material and are biased toward the pins when aligned with the notch openings, the clips being bendable to clear the flared flanges when bent away from the pins and pivoted out of alignment with the notch openings.

In still a further aspect of the removable end gate arrangement, the clips are made of spring steel or plastic.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
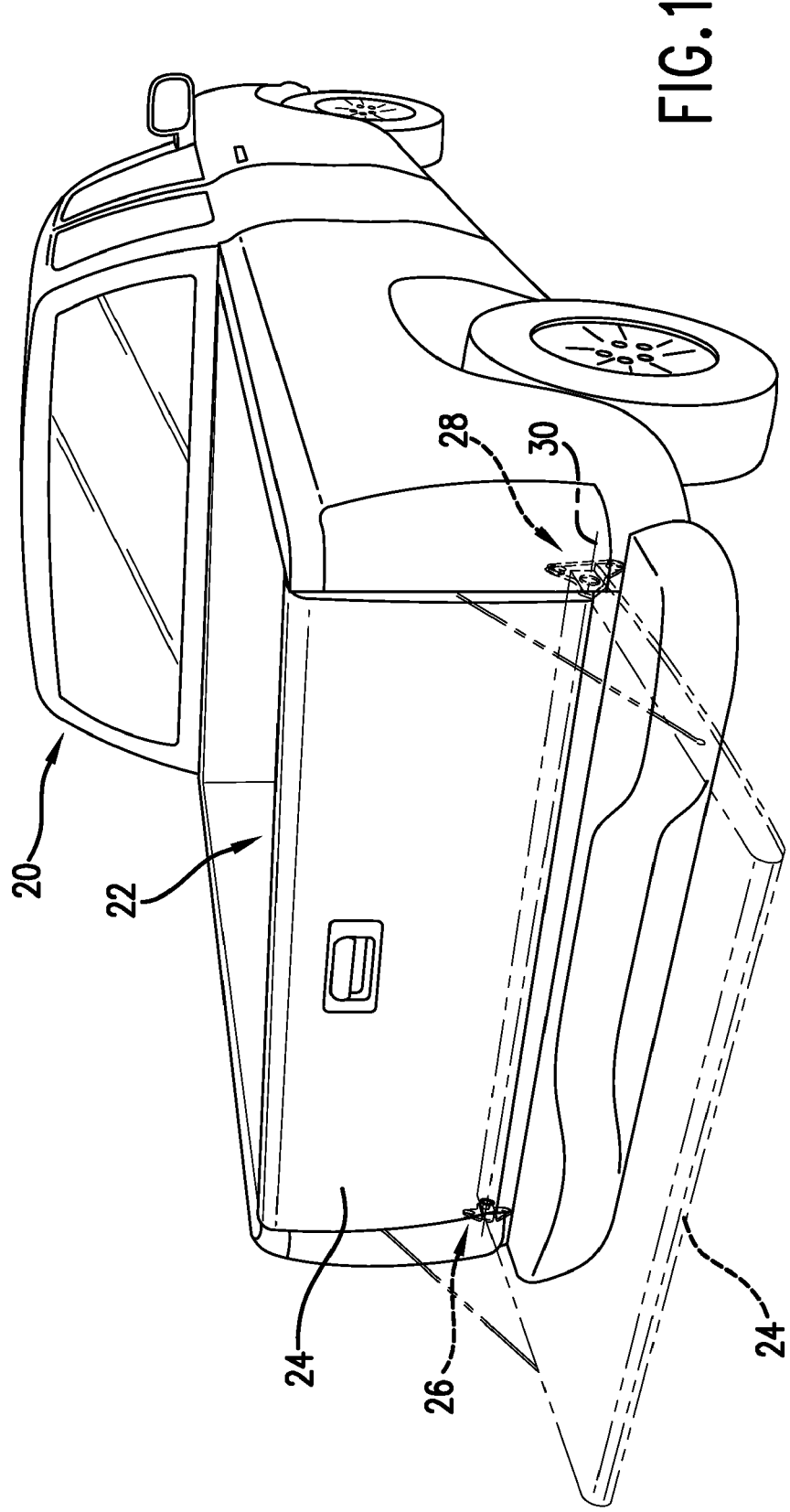
FIG. 1 is a perspective view of an automotive vehicle having an end gate in a closed position in solid lines and in an open position in dotted lines.

Referring now to FIG. 1, there is shown an automotive of vehicle 20, such as a pick-up truck or the like, which has a cargo area portion 22 that is closed by an end gate portion 24. The end gate portion 24 is pivoted on hinges 26 and 28 so that the end gate is rotatable about a common axis 30 from a closed position shown in solid lines to an open position shown in dotted lines.

Figure 2:
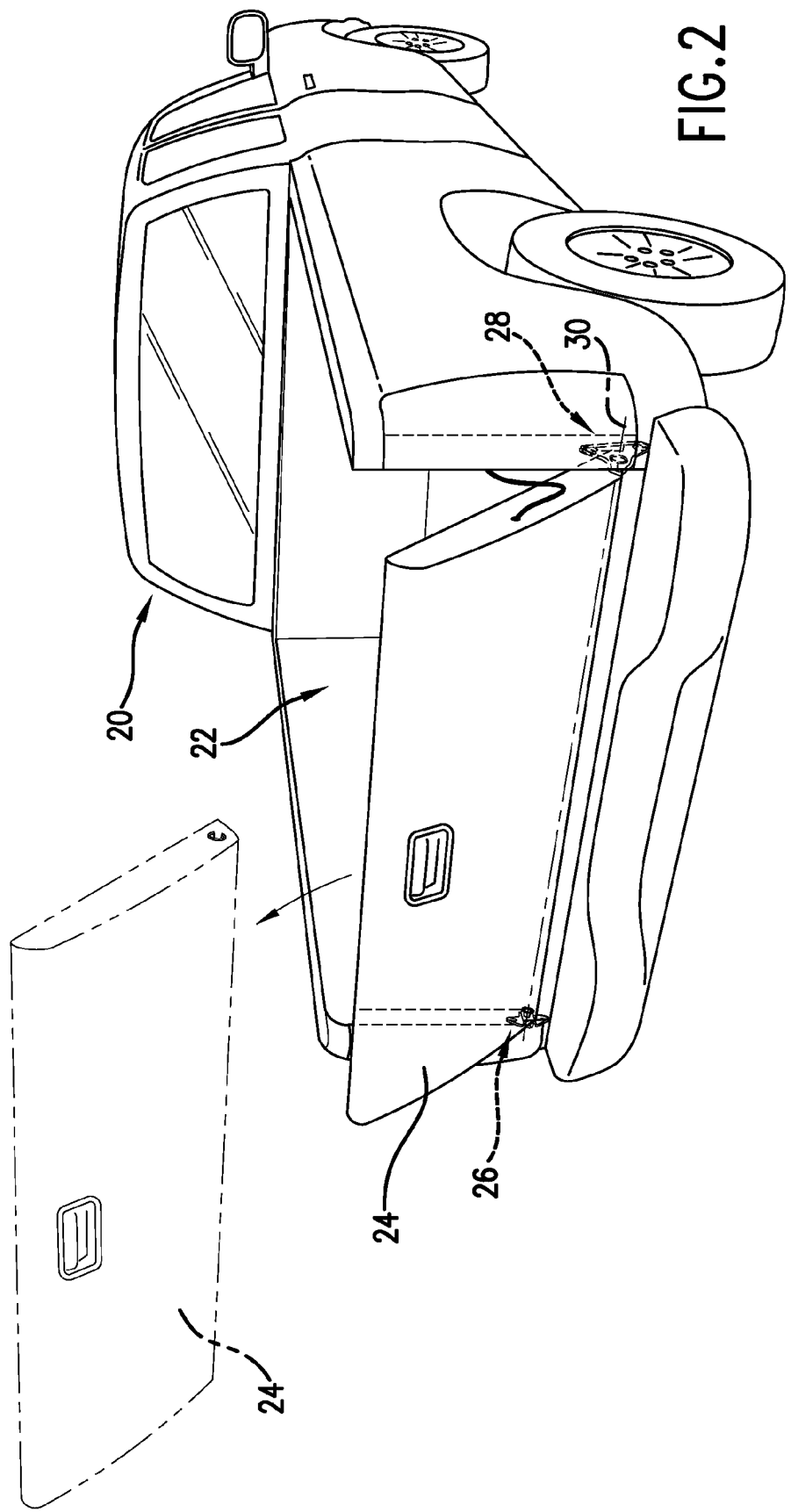
FIG. 2 is a view similar to FIG. 1, but showing the end gate in an intermediate position for removal in solid lines and removed in dotted lines.

Referring now to FIG. 2, the vehicle 20 is illustrated with the end gate portion 24 at an intermediate position between the solid and dotted line positions of FIG. 1, which intermediate position allows the end gate portion 24 to be removed from the cargo area portion 22 to leave the cargo area open without the presence of the end gate.

Figure 3:
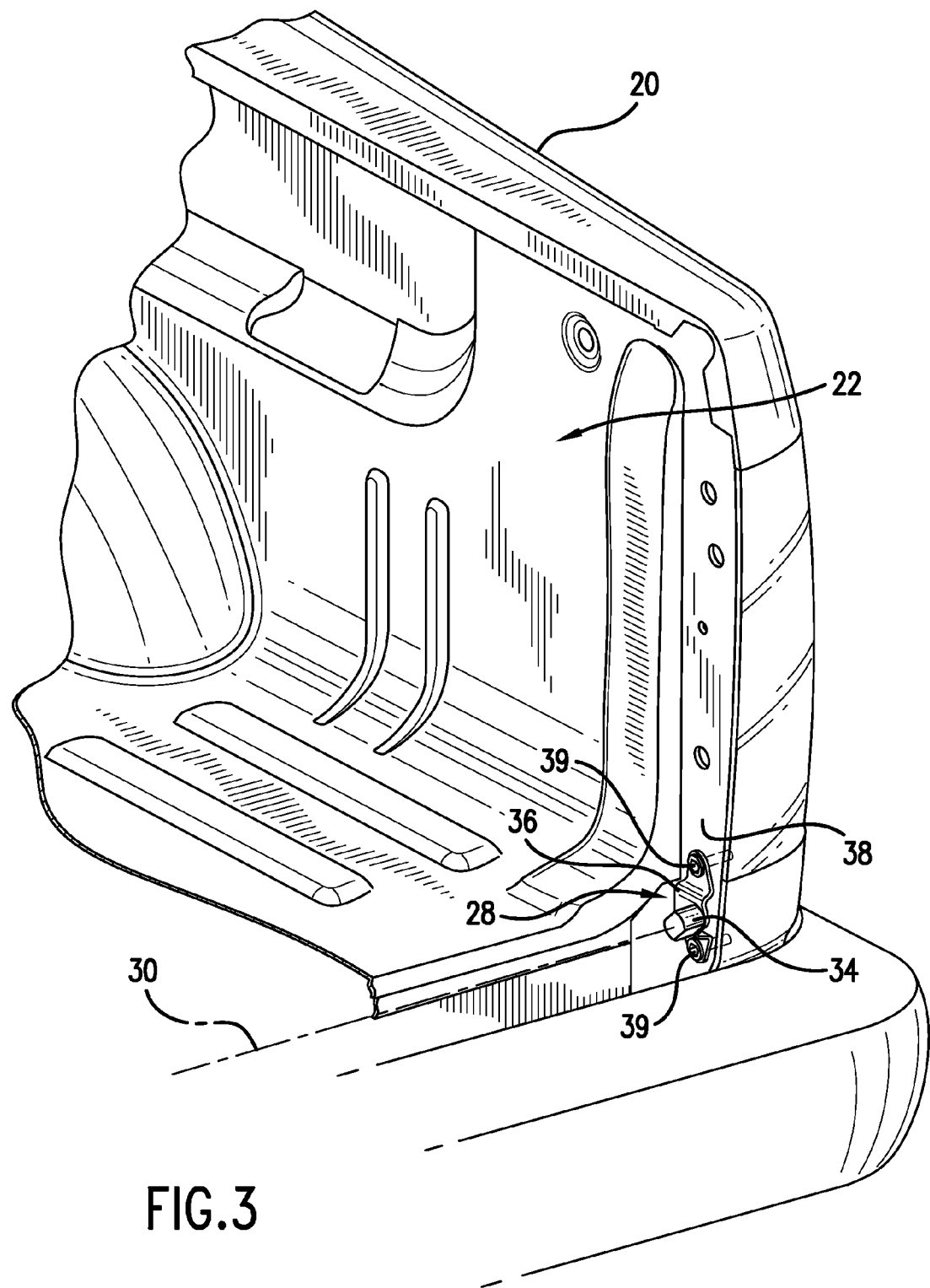
FIG. 3 is a rear perspective view showing one of a pair of pins on a cargo portion of the vehicle of FIGS. 1 and 2.

Referring now to FIG. 3 where the cargo area 22 is shown without the end gate 24, a pin 34 of the hinge 28 is shown extending from a base 36 that is bolted to a flange 38 by bolts 39 disposed at the opening of the cargo area 22. The pin 34 is integral with and fixed with respect to the base 36. On the opposite side of the cargo area 22, there is a pin 34 identical to the pin 34 shown in FIG. 3, which pin comprises a first portion of the hinge 26 (FIG. 1). Consequently, the end gate 24 shown in FIGS. 1 and 2 is mounted for rotation about the axis 30 which passes through the pins 34 of both the hinges 26 and 28.

Figure 4:
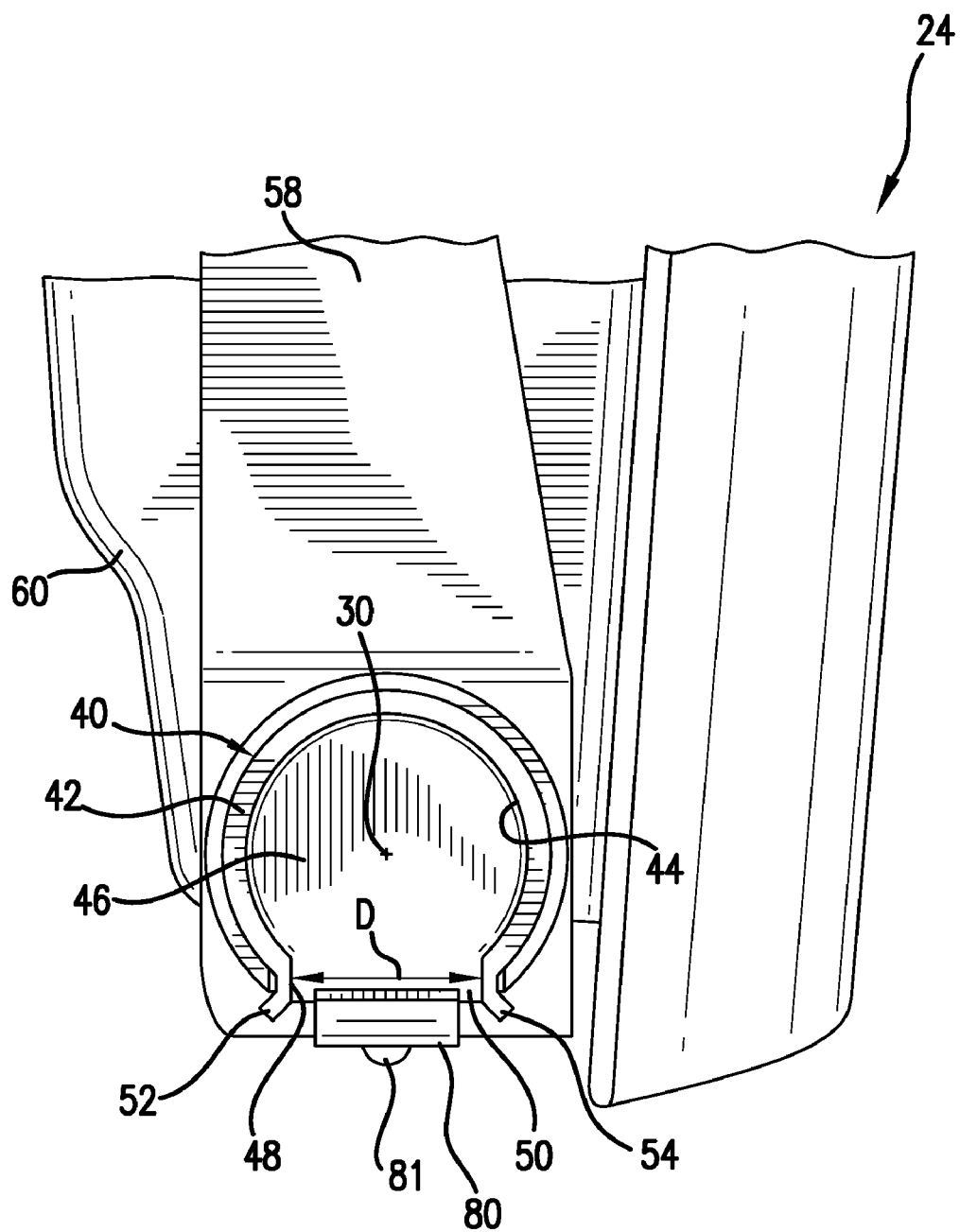
FIG. 4 is a side perspective view of one of a pair of cups on an end gate portion of the automotive vehicle of FIGS. 1-3.

Referring now to FIG. 4, the end gate 24 has a pair of cups 40 on opposite sides thereof, the cup 40 for the hinge 26 being shown in FIG. 4. A similar cup 40 opens in the opposite axial direction and is used to form the hinge 28. The cup 40 has a rim 42 with a substantially cylindrical inner wall surface 44 that defines a substantially cylindrical space 46. The wall 44 has a notch 48 therein of a width D, the notch having a flared opening 50 defined by a pair of diverging flanges 52 and 54. The cup 40 has a bottom that is fixed to a mounting base 58 that is bolted or otherwise secured to an outer portion 60 of the end gate 24.

Figure 5:
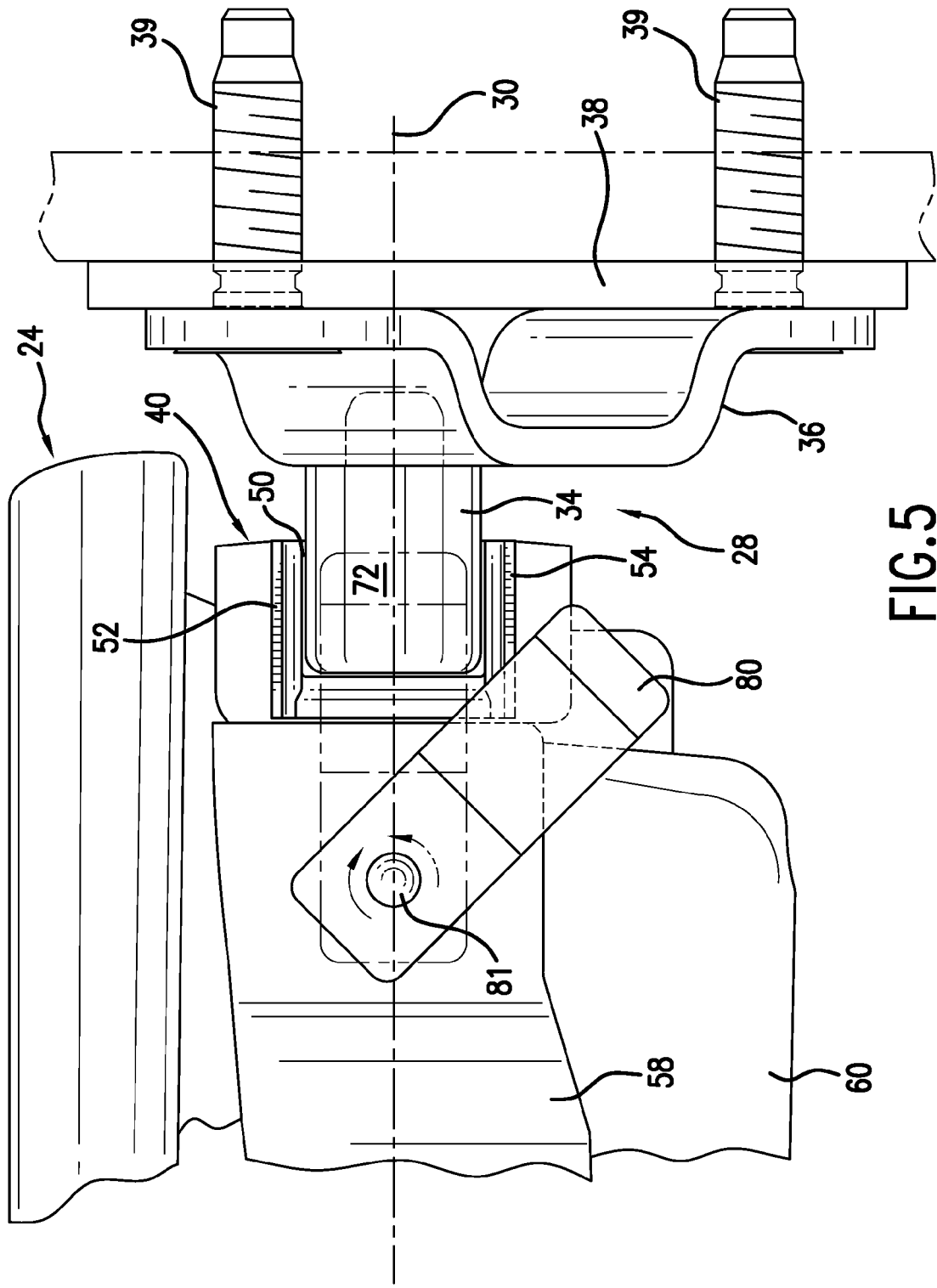
FIG. 5 is a bottom view of the cup of FIG. 4 in engagement with the pin of FIG. 3 forming a hinge that supports the tailgate portion of the vehicle on the cargo portion of the vehicle in an intermediate position.
Figure 6:
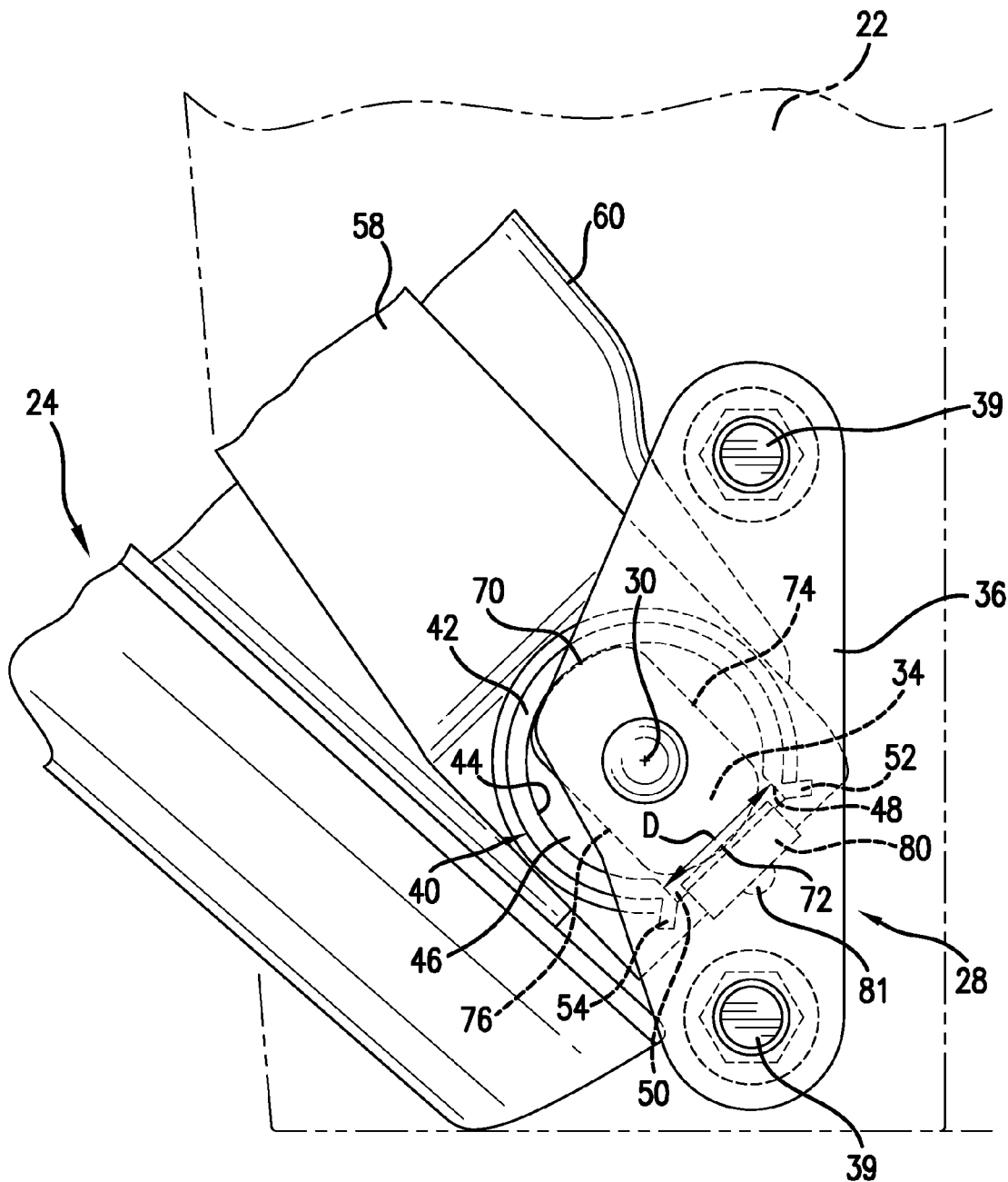
FIG. 6 is a side view showing the hinge of FIG. 5 but wherein the tailgate portion is in the intermediate position with respect to the cargo portion.

Referring now to FIGS. 5 and 6, the right side of the end gate 24 is shown mounted to the cargo area 22 by the hinge 28. The left side of the end gate 24 is mounted to the cargo area 22 by a similar hinge 26 (see FIGS. 1 and 2). To form the hinges 28 and 26, the pins 34 are received in the cups 40 by moving the end gate 24 laterally with respect to the axes 30 of the pins 34 so that the pins pass through the notches 48 in the cups. Since the pins 34 have a pair of opposed arcuate surfaces 70 and 72 of equal radius with respect to the axis 30 and a pair of opposed flats 74 and 76 having radii, which are less than the radius of the arcuate surfaces, the pins 34 are initially slidable through the notches 48. As is best seen in FIG. 5 pivoted, hinge retainer clips 80 are initially positioned in an open position so that the pins 34 can enter the cups 40. After the pins 34 are seated in the cups 40, the hinge retainer clips 80 are pivoted on rivets 81 to overlie the pins in order to prevent the end gate 24 from becoming accidentally released from the cargo area 22 (see FIG. 9).

Figure 7:
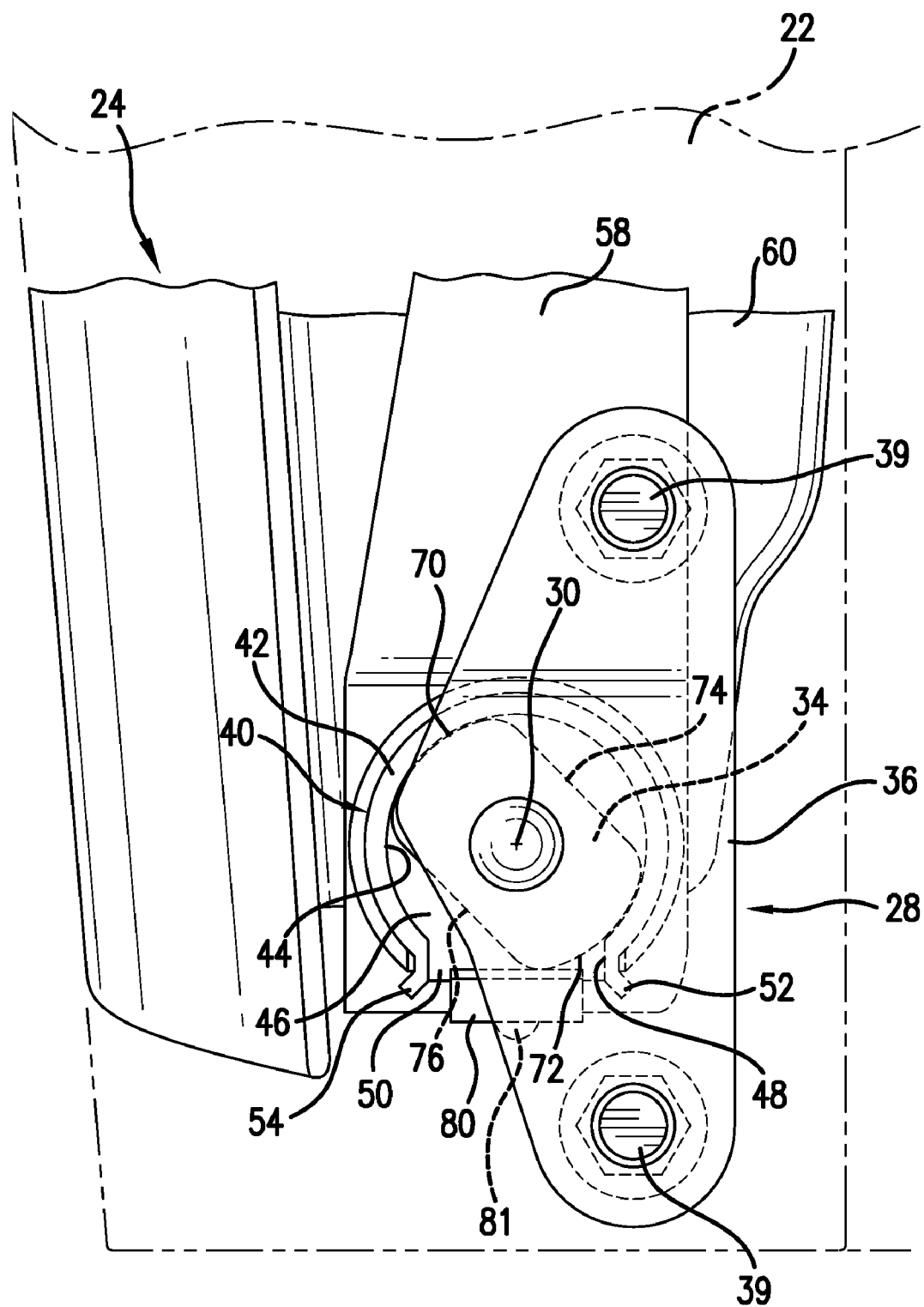
FIG. 7 is a side view showing the hinge of FIG. 5 and when the tailgate portion in the closed position with respect to the cargo portion.

In FIG. 7 the end gate 24 has been rotated from the FIG. 6 position where the flats 74 and 76 are aligned with the slots 50 in the hinges 26 and 28 to the end gate closed position where the arcuate portions 70 and 72 bear against the inner wall surfaces 44 of the cups 40 so that the end gate 24 is supported to rotate about the axis 30. While in the closed position of FIG. 7, the flats 74 and 76 are out of alignment with the openings 50 of the notches 48 so that the end gate 24 is positively retained in the closed position.

Figure 8:
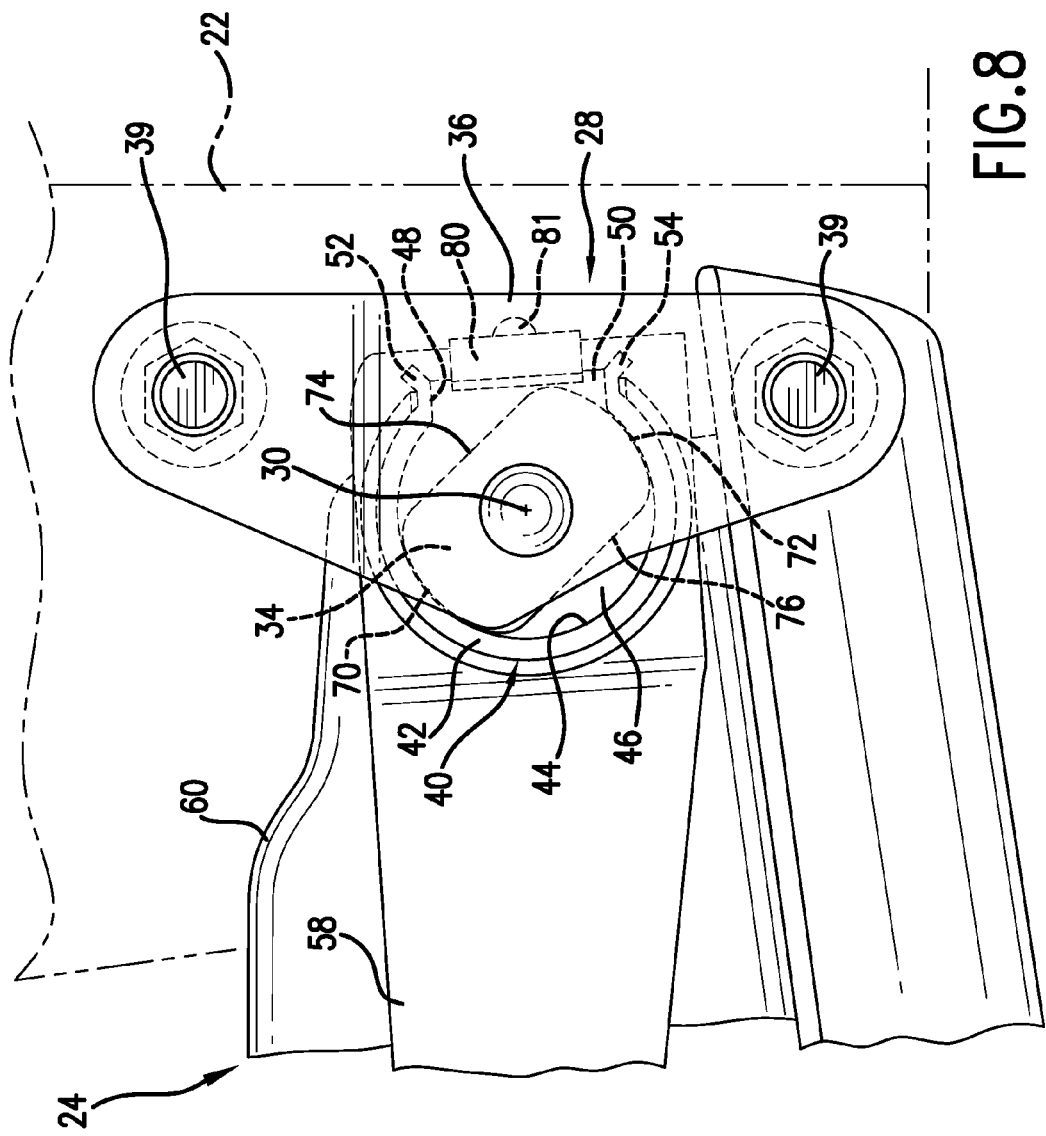
FIG. 8 is a side view showing the hinge of FIGS. 5-7 when the tailgate portion is in the open position with respect to the cargo portion.

From the closed position of FIG. 7, the end gate 24 is rotated substantially 90° to the open position of FIG. 8 in which the cups 40 of the hinges 26 and 28 on opposite sides of the end gate 24 rotate around the pins 34 past the openings 50 of the notches 48 while the inner surfaces 42 of the cups 40 continue to bear against the arcuate surfaces 70 and 72 of the pins 34. When in the FIG. 8 position the end gate 24 can not be removed from the cargo area because the flats 72 and 74 are not aligned with the notches 48 in the cup 34 and because the arcuate surfaces 70 and 72 of the pins 34 are seated against the complementary inner surfaces 42 of the cups 40.

Figure 9:
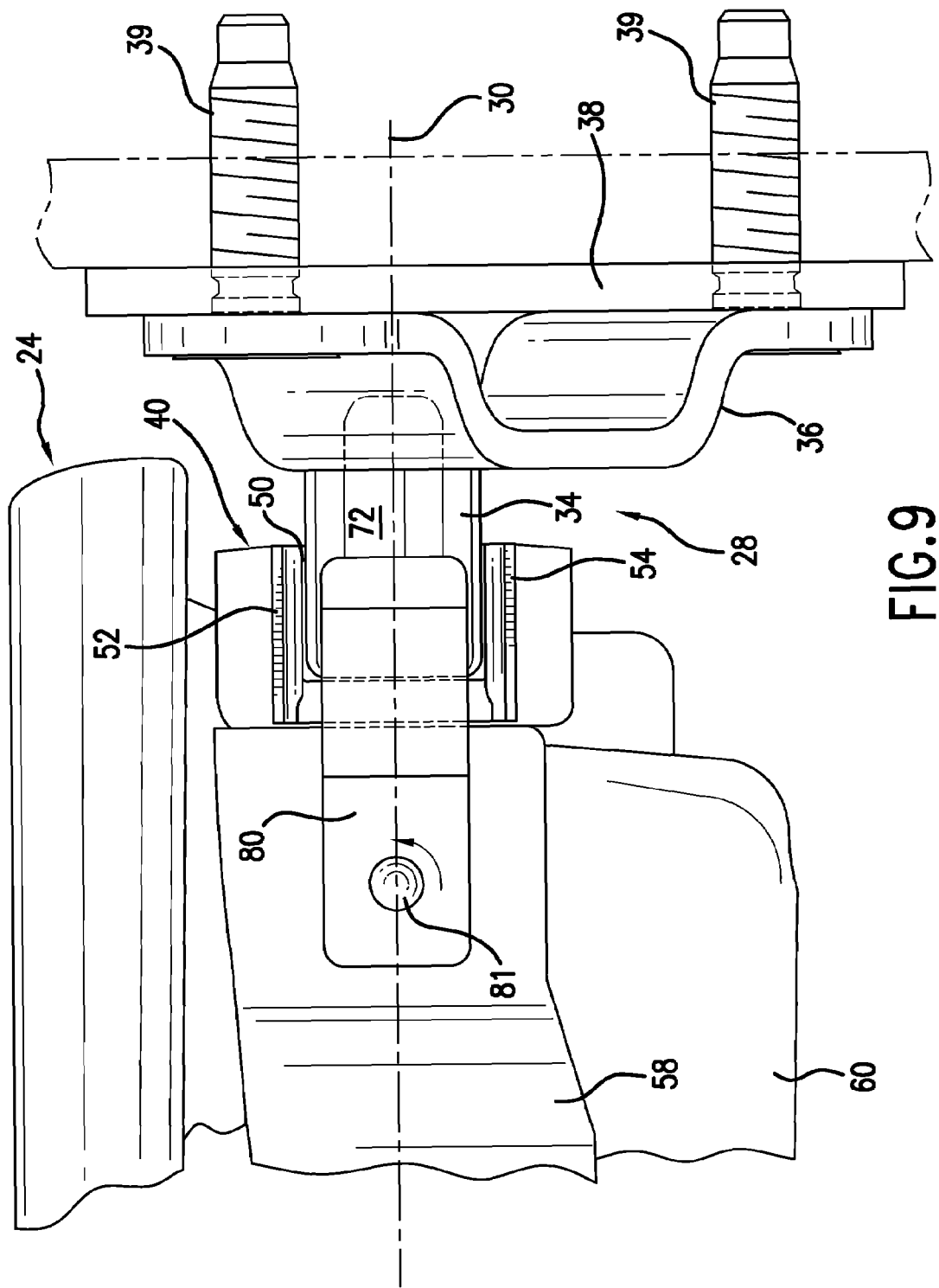
FIG. 9 is a bottom view of the hinge similar to FIG. 5 but showing a hinge retainer clip in a first position preventing removal of the tailgate portion from the cargo area portion.

Hinge retainer clips 80 prevent the end gate 24 from becoming accidentally dislodged from the cargo area 22 if the end gate should for some reason be in the intermediate position of FIGS. 6 and 9. When it is desired to remove the end gate 24 from the cargo area 22, the hinge clips 80 are rotated about the rivets 81 from the position of FIG. 9 to the position of FIG. 5 where the openings 50 of the notches 48 are uncovered. This allows the end gate 24 to be lifted away from the opposed pins 34 on the cargo area 22 so as to be completely removed from the vehicle as is shown in FIG. 2.

In the illustrated embodiment of FIG. 9, the retainer clips 80 are preferably made of spring steel and are normally retained in position over the opening 50 by the pair of flared flanges 54 (also see FIG. 6). Since the hinge clip 80 is resilient, it can be deflected manually so as to move over one of the flared flanges 54 that normally keep the hinge clips 80 over the pins 34. When the end gate 24 is remounted on the cargo area 22 as is shown in FIG. 5, the hinge clips 80 are simply rotated back to cover the pins 34 as shown in FIGS. 6 and 9.

Figure 10:
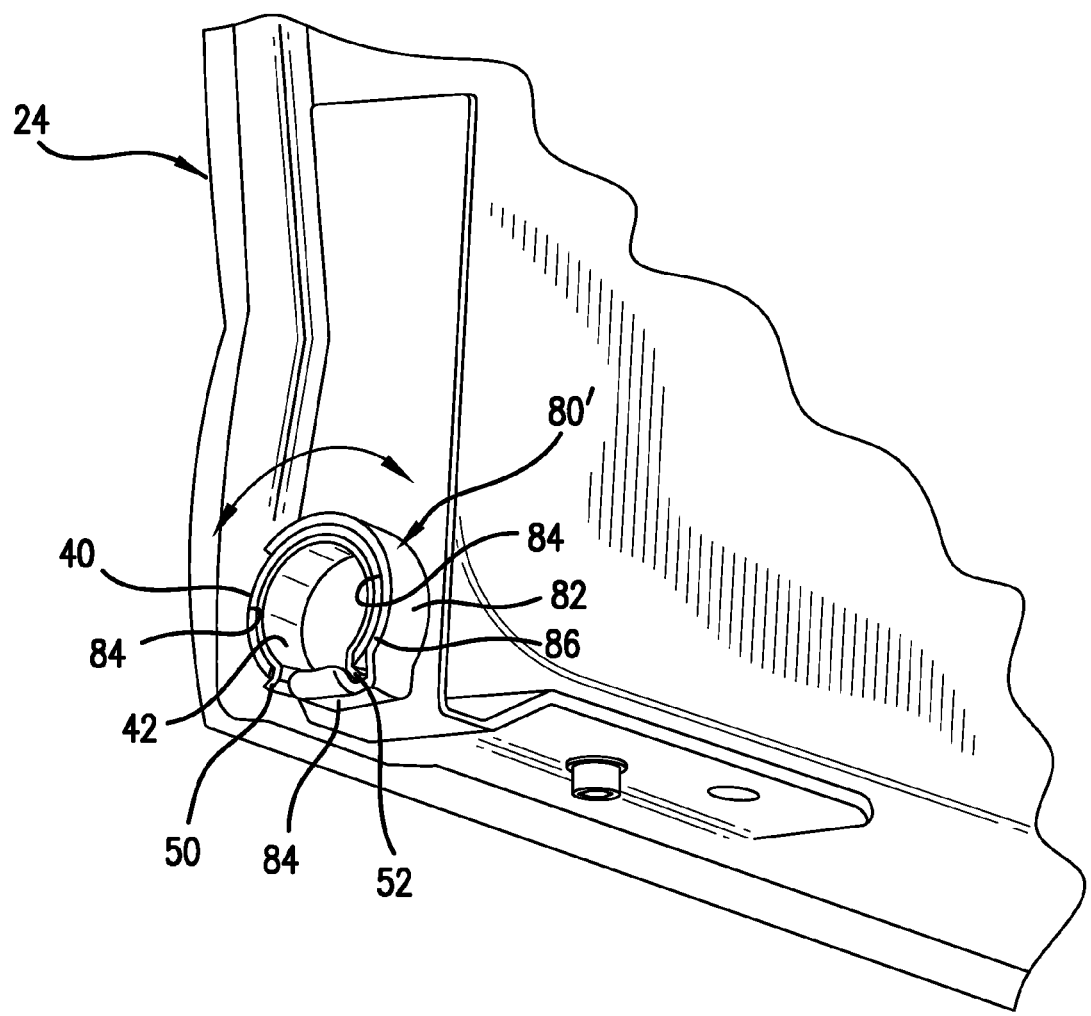
FIG. 10 is a side perspective view showing an alternative embodiment for the spring clip used to retain the end gate portion on the cargo portion.

Referring now to FIG. 10, there is shown a second embodiment 80' of the hinge retainer clips 80, wherein each of the hinge clips are preferably configured as a resilient plastic annulus 82 with a tab 84 which resiliently snaps between the flared flanges 52 and 54 to cover the notches 48 in the walls 42 of the cups 40. Each annulus 82 has an arcuate inner wall surface 84 that complements the outer wall surface 86 of the associated cup rim 42 so that the annulus 82 rotates thereon. By rotating the annuluses 82 counter-clockwise, the tabs 84 snap out of engagement with the flanges 52 and 54 and open the notches 48. This allows the pins 34 of FIG. 3 which project inwardly from the cargo area 22 to laterally disengage from the cups 40. Upon rotating the annulus 82 in the clockwise or opposite direction, the openings 50 of the notches 48 are again closed to lock the associated pins 34 (FIG. 3) in the cups 40. Preferable plastic materials for the annulus 82 are materials which withstand an outdoor environment such as NYLON™, polyesters, polycarbonates, polyethyleneoxide, PPO and ABS. The material of the annuluses 82 may also be in composite form. Each annulus 82 is therefore selectively rotatable on its respective cup 40 to lock and release the end gate 24 with respect to the cargo area 22.

In a preferred embodiment the annuluses 82 are rotated by gripping the exterior surfaces thereof between one's thumb and forefinger. In an alternative embodiment radially projecting handles may be used to rotate the annuluses.

From the foregoing description, one skilled in the art can easily ascertain the essential characteristics of this invention, and without departing form the spirit and scope thereof, can make various changes and modifications of the invention to adapt it to various usages and conditions.

We claim:

1. A removable end gate arrangement wherein an end gate portion of a vehicle is removable from a cargo portion of a vehicle upon rotating the end gate about an axis to a selected position and then moving the end gate laterally with respect to the axis, the arrangement comprising:

a pair of cups on one of the cargo or end gate portions, each cup defining a trunion of a hinge and each cup having a laterally opening notch therein that extends in an axial direction with respect to the hinge and includes diverging flanges defining the laterally opening notch, the cups having end openings oriented in opposite directions;

a pair of pins on the other of the cargo or end gate portions, the pair of pins extending in opposite directions and being received in the pair of cups to configure the hinge, each of the pins having a first cross-sectional area larger than the lateral opening of the notch and a second cross-sectional area smaller than the lateral opening of the notch, wherein when the second cross-sectional areas align with the notch the tailgate portion is removable from the cargo portion, and a pair of retainer clips rotatably mounted on one of the cargo or end gate portions for rotary movement with respect to the notches in the cups from first positions in which the retainer clips overlie the notches and are captured between the diverging flanges and block the lateral opening of the notches to second positions in which the retainer clips are displaced from capture between the diverging flanges and rotary displaced from and not overlying the lateral openings of the notches, to allow the pins to be removed from the notches when the second cross-sectional areas are aligned with the notches thereby permitting the tailgate portion to be detached from the cargo area portion.

2. The removable end gate of claim 1 wherein the cups are mounted on the end gate and the retainer clips are annular and are rotatably mounted on the cups and the retainer clips have tabs that snap out of engagement between the diverging flanges of the cup retainers.

3. The removable end gate arrangement of claim 2 wherein the retainer clips are made of plastic.

4. The removable end gate arrangement of claim 1 wherein the first cross-sectional area has a diameter defined by a major axis extending between a pair of outer arcuate surfaces complementing inner arcuate surfaces of the cup and wherein the second cross-sectional has a diameter defined by a minor axis shorter than the major axis and extending between opposed flats.

5. The removable end gate arrangement of claim 1 wherein the cups are mounted on the end gate and the retainer clips are mounted on the end gate by pivots.

6. The removable end gate arrangement of claim 5 wherein the clips are made of a resilient material and are biased toward the pins when aligned with the notch openings and are bendable to clear the flared flanges when bent away from the pins and pivoted out of alignment with the notch openings.

7. The removable end gate arrangement of claim 5 wherein the retainer clips are made of spring steel.

8. The removable end gate arrangement of claim 1 wherein the retainers are clips having an annulus which are rotatably mounted on exterior surfaces of the cups;
the annuluses having tabs which selectively either overlie or uncover the notches.

9. A removable end gate arrangement wherein an end gate portion of a vehicle is removable from a cargo portion of a vehicle upon rotating the end gate about an axis to a selected position and then moving the end gate laterally with respect to the axis, the arrangement comprising:
a pair of cups on one of the cargo or end gate portions, each cup defining a trunion of a hinge and each cup having a laterally opening notch therein that extends in an axial direction with respect to the hinge and includes diverging flanges defining the laterally opening notch, the cups having end openings oriented in opposite directions;
a pair of pins on the other of the cargo or end gate portions, the pair of pins extending in opposite directions and being received in the pair of cups to configure the hinge, each of the pins having a first cross-sectional area larger than the lateral opening of the notch and a second cross-sectional area smaller than the lateral opening of the notch, wherein when the second cross-sectional areas align with the notch the tailgate portion is removable from the cargo portion, and
a pair of retainer clips configured as annuluses rotatably mounted on the cups with respect to the notches in the cups and each retainer clip having a resilient tab, said retainer clips being rotatable from first positions in which the resilient tabs on the retainers are resiliently positioned between the diverging flanges to block the lateral opening of the notches to second positions where the resilient tabs are resiliently displaced away from the diverging flanges and the retainer clip is rotated away from blocking the lateral openings of the notches, to allow the pins to be removed from the notches when the second cross-sectional areas are aligned with the notches thereby permitting the tailgate portion to be detached from the cargo area portion.

10. The removable end gate arrangement of claim 9 wherein the retainers are made of resilient plastic material.

11. The removable end gate arrangement of claim 9 wherein the cups have circular outer surfaces and the annuluses have circular inner surfaces complementary to the circular outer surfaces of the cups.

12. The removable end gate arrangement of claim 9 wherein the pair of cups are on the end gate portion of the vehicle and the pair of pins are on the cargo area portion of the vehicle.

13. A removable end gate arrangement wherein an end gate portion of a vehicle is removable from a cargo portion of a vehicle upon rotating the end gate about an axis to a selected position and then moving the end gate laterally with respect to the axis, the arrangement comprising:
a pair of cups mounted on one of the cargo or end gate portions, each cup defining a trunion of a hinge and each cup having a laterally opening notch therein that extends in an axial direction with respect to the hinge and includes diverging flanges defining the laterally opening notch, the cups having end openings oriented in opposite directions;
a pair of pins on the other of the cargo or end gate portions, the pair of pins extending in opposite directions and being received in the pair of cups to configure the hinge, each of the pins having a first cross-sectional area larger than the lateral opening of the notch and a second cross-sectional area smaller than the lateral opening of the notch, wherein when the second cross-sectional areas align with the notch the tailgate portion is removable from the cargo portion, and
a pair of retainer clips pivotally mounted on the one of the cargo or end gate portion to which the cups are mounted, said retainer clips being rotatable from first positions in which the retainers clips are resiliently positioned between the diverging flanges to block the lateral opening of the notches to second positions where the retainer clips are resiliently displaced away from the diverging flanges and rotated away from blocking the lateral openings of the notches, to allow the pins to be removed from the notches when the second cross-sectional areas are aligned with the notches thereby permitting the tailgate portion to be detached from the cargo area portion.

14. The removable end gate arrangement of claim 9 wherein the retainers are made of resilient spring steel.

15. The removable end gate arrangement of claim 13 wherein the pair of cups are on the end gate portion of the vehicle and the retainer clips are mounted on the end gate of the vehicle.

16. The removable end gate arrangement of claim 15 wherein the retainer clips are mounted on the end gate by pivots acting between the retainer clips and the end gates.

* * * * *